(12) United States Patent
Sommer

(10) Patent No.: US 6,220,654 B1
(45) Date of Patent: Apr. 24, 2001

(54) PASSENGER CAR

(76) Inventor: Ulrich Sommer, Hansastrasse 75, D-81373 Munich (DE)

( * ) Notice: Subject to any disclaimer, the term of this patent is extended or adjusted under 35 U.S.C. 154(b) by 0 days.

(21) Appl. No.: 09/384,828

(22) Filed: Aug. 27, 1999

Related U.S. Application Data

(63) Continuation-in-part of application No. PCT/EP98/01114, filed on Feb. 27, 1998.

(30) Foreign Application Priority Data

Feb. 28, 1997 (DE) .......................................... 297 03 663 U

(51) Int. Cl.$^7$ ...................................................... B60J 7/00
(52) U.S. Cl. .............................. 296/189; 296/64; 296/63; 296/177; 296/203.03
(58) Field of Search ................................. 296/204, 203.03, 296/63, 64, 901, 185, 209, 177

(56) References Cited

U.S. PATENT DOCUMENTS

| | | | |
|---|---|---|---|
| 2,533,752 | 12/1950 | Alamagny | 180/21 |
| 2,656,214 | 10/1953 | Alamagny | 296/28 |
| 3,002,782 | 10/1961 | Jahn | 286/28 |
| 3,560,041 | * 2/1971 | Foster | 296/64 |
| 3,630,566 | * 12/1971 | Barecki | 296/63 |
| 3,718,344 | * 2/1973 | Lohr et al. | 296/177 |
| 3,762,764 | * 10/1973 | McJunkin | 296/63 |
| 4,118,061 | * 10/1978 | Atkinson et al. | 296/63 |
| 4,428,599 | * 1/1984 | Jahnle | 296/204 |
| 4,513,981 | * 4/1985 | DeGraaff et al. | 296/177 |

(List continued on next page.)

FOREIGN PATENT DOCUMENTS

| | | |
|---|---|---|
| 834 648 | 3/1952 | (DE) . |
| 1 059 779 | 6/1959 | (DE) . |
| 05 2 056 713 | 11/1970 | (DE) . |
| 23 47 937 | 9/1973 | (DE) . |
| 42 21 396 A1 | 6/1992 | (DE) . |
| 42 43 186 A1 | 12/1992 | (DE) . |
| 195 17 854 A1 | 5/1995 | (DE) . |
| 195 40 384 A1 | 10/1995 | (DE) . |
| 196 13 446 A1 | 4/1996 | (DE) . |
| 599706 | 3/1925 | (FR) . |
| 2142843 | 2/1973 | (FR) . |
| 2191519 | 2/1974 | (FR) . |
| 177164 | 3/1922 | (GB) . |
| 3334188 | 5/1929 | (GB) . |
| 624420 | 12/1945 | (GB) . |
| 2 295 358 | 10/1995 | (GB) . |
| PCT/CA96/00637 | 9/1995 | (WO) . |

OTHER PUBLICATIONS

Sportscar for the Million. In: The Motor, Apr. 23,1958 pp. 450–452.

Nutzfahrzeuge. In: Automobile Revue, Aug. 17, 1978; p. 33.

*Primary Examiner*—Joseph D. Pape
*Assistant Examiner*—Kiran Patel
(74) *Attorney, Agent, or Firm*—Graybeal Jackson Haley LLP

(57) ABSTRACT

The passenger car has a supporting structure, with at least two longitudinal members (1). The longitudinal members are joined together in the middle by means of a torsionally rigid cross-member (2) which is constructed as a large-volume tubular profile and accommodates at least parts of the transmission, while the longitudinal members (1) at the side bend upwards from a floor panel (5) and in order to increase the flexural rigidity of the longitudinal member (1) about the transverse axis, the vertical extension of longitudinal member (1) is sufficiently great that the top edge (1) is located at least at the height of the seating-surface of the driver's seat.

12 Claims, 2 Drawing Sheets

U.S. PATENT DOCUMENTS

| | | |
|---|---|---|
| 4,708,361 | 11/1987 | Takada . |
| 4,709,958 * | 12/1987 | Harrod .................................. 296/177 |
| 4,747,636 * | 5/1988 | Harasaki et al. ................. 296/203.03 |
| 4,900,083 * | 2/1990 | Kumasaka et al. ............. 296/203.03 |
| 5,174,628 * | 12/1992 | Hayatsugu et al. ................... 296/204 |
| 5,193,879 * | 3/1993 | Chen ..................................... 296/204 |
| 5,195,780 * | 3/1993 | Inoue et al. .......................... 296/204 |
| 5,314,230 * | 5/1994 | Hutchison et al. ................... 296/204 |
| 5,921,618 * | 7/1999 | Mori et al. ............................. 296/63 |
| 5,934,745 * | 8/1999 | Moore et al. ........................ 296/185 |
| 6,056,078 * | 5/2000 | Pham ..................................... 296/64 |

* cited by examiner

U.S. Patent    Apr. 24, 2001    Sheet 1 of 2    US 6,220,654 B1
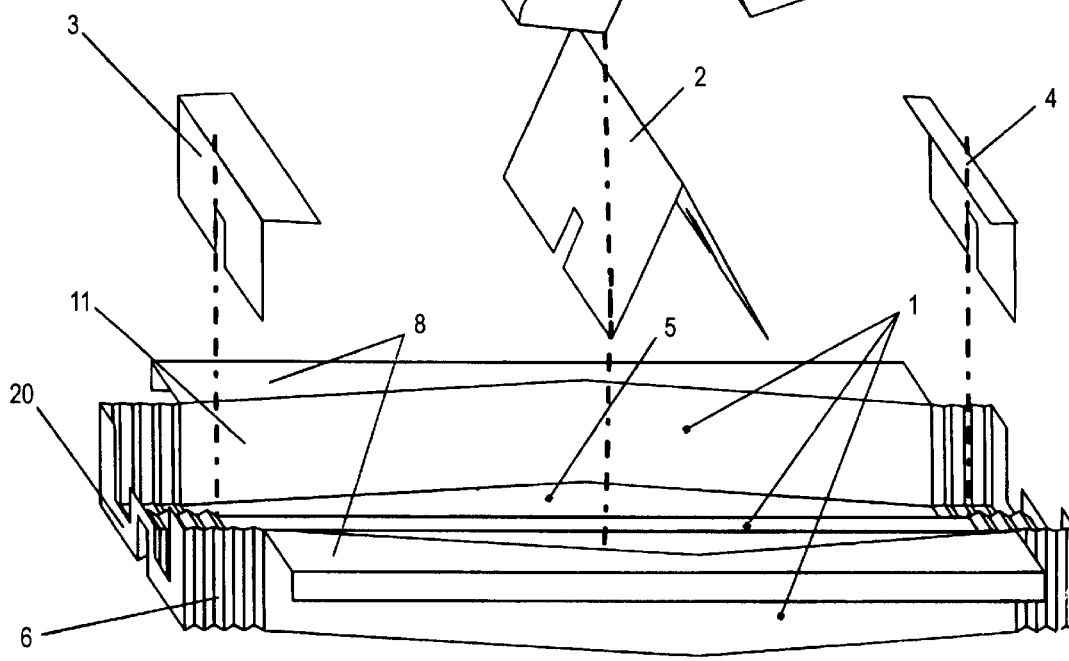

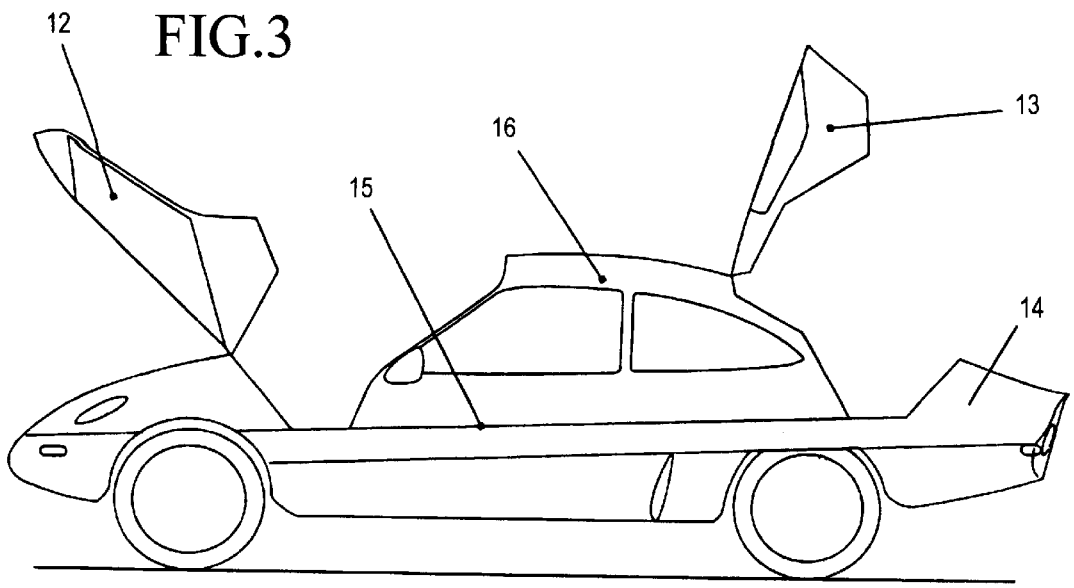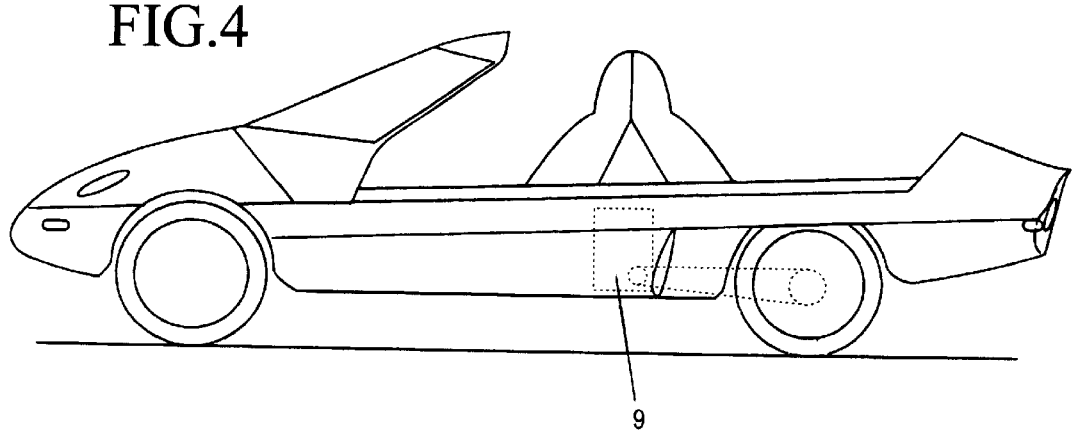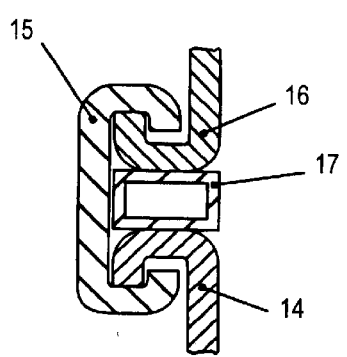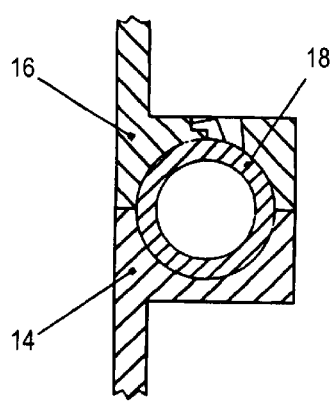

PASSENGER CAR

This is a continuation-in-part of co-pending International Application PCT/EP98/01114 filed on Feb. 27, 1998 designating the United States.

The invention relates to a passenger car with a supporting structure which has at least two longitudinal members of frame.

That principle is already known from the Monochock, in which a hollow profile forming a longitudinal member of frame with only a small opening for the passengers ensures rigidity and passenger protection, and from the Zündapp Janus, in which the seats rest against a transverse tunnel.

With conventional passenger cars approved for road traffic, the cell can, in the event of frontal and rear impact, not pass on forces from the crumple zones where they are created, but diverts them around the door openings to the floor assembly and to the roof. Diversion of the forces entails the use of more materials and thus increases the weight. In the event of a side impact, the door openings also prove to be dangerous weak points for passenger safety and substantially reduce the rigidity of the vehicle. With the monocoques, whilst there is more provision for passenger safety, the structure which in this case is open at the top requires still more torsional rigidity of the longitudinal member of frame and the smallest possible opening in order not to impair this. Normal entry and exit and the release of passengers from an overturned vehicle is made more difficult. This is why the monocoque is used predominantly for racing.

A structure is also known from the Zündapp Janus ® with a transverse tunnel in the centre of the vehicle and a side surface with no interruptions due to doors. The cross-member of frame is open at the bottom and therefore not torsionally rigid. This structure obtains its torsional rigidity by including the vehicle roof in the structure. As the vehicle has closing front and back doors, incorporation of a crumple zone presents problems with this principle.

This invention seeks to achieve improved passenger safety and greater rigidity with minimum consumption of material as compared with conventional PKWS (passenger cars).

This objective is fulfilled by a passenger car of the type mentioned above, in which the longitudinal members of frame are joined together in the middle by means of a torsionally rigid cross-member of frame which is constructed as a large-volume, tubular profile and accommodates at least parts of the drive unit, while the longitudinal members at the side bend upwards from a floor panel, and in order to increase the flexural rigidity of the longitudinal members around the cross-member, the vertical extension of the longitudinal members is sufficiently great that the top edge is at least at the height of the seat-surface of the driver's seat. The construction according to the invention means that the forces generated in a collision are transmitted in a straight line by the supporting structure. The supporting structure can be made especially robust at points where forces are generated and its torsional rigidity is not restricted by the size of the doors.

The advantages attainable by the invention lie particularly in the functional integration to the greatest extent possible of the structural elements of the transmission, the chassis, the seats and the seat belts, both when running and in the event of impact from different directions. Getting in and out is uncomplicated. Release of passengers after an accident, especially if the vehicle overturns, is ensured.

A passenger car according to the invention offers a high degree of rigidity when running and cell-strength in the event of frontal and side impact with minimum consumption of materials. As the roof is not a load-bearing element of the structure, the entry opening can be extended upwards and the vehicle can also be used as a convertible without additional weight.

Preferred embodiments of the invention are described in the dependent claims.

An exemplary embodiment of the invention is explained below with the aid of the drawings. It shows:

FIG. 1 the load-bearing elements of a passenger car, in a perspective view;

FIG. 2 the load-bearing elements, in an exploded view;

FIG. 3 a passenger car with the front doors and tailgate open, in a side view;

FIG. 4 a convertible version, in a side view; and

FIGS. 5 and 6 a releasable junction point between bodywork elements.

FIGS. 1 and 2 show the load-bearing structure of a passenger car. Three longitudinal beams or members 1 of frame, a floor panel 5 with integral third longitudinal beam or member 1 of frame in the middle and two crumple zones 6 at the front and rear ends of the longitudinal members 1 are constructed as inverted hat-shaped (sheet) longitudinal profiles 11 which extend over virtually the entire length of the vehicle. The third longitudinal member 1 is formed by an indentation comparable with a prop shaft tunnel in the middle of the hat-shaped longitudinal profile. Vertical side walls of the longitudinal profile 11 act as longitudinal members 1 and at the top edges are bent outwards and downwards forming flanges 8 at the top. The flanges 8 can also be constructed as square tubes. The two longitudinal members 1 are joined together, approximately in or just behind the middle, by a torsion-resistant cross-beam or cross-member 2 of frame. At the front and rear ends, predetermined deformation points are integrally made by fine transverse corrugation for the crumple zone. Two fore and aft cross-members 3, 4 are constructed as vertical plates bent upwards for rigidity, which consequently also delimit respectively the front or back of the passenger compartment. A torsion-resistant cross-member 2 is simply a sheet (panel) folded downwards at an acute angle which is fixed to the floor panel 5 and the side walls and with only the floor panel 5 forms a closed profile of triangular tubular cross-section. The other two surfaces support the backs of the front seats and of the rear seats facing away from the direction of travel and are joined with the longitudinal members 1 and with the top flanges 8 of the longitudinal member 1.

The longitudinal members 1 and possibly the floor panel are extended at the front in the form of the energy-absorbing crumple zone 6 ahead of the forward cross-member 3 and at the frontal end by a bumper 20, which prevents penetration by obstacles in the middle and buckling outwards to one side of a crumple zone 6. At the back behind the rear cross-member 4 a corresponding crumple zone (not shown in FIG. 1) is useful.

The space inside the cross-member 2 houses the engine with gears and differential gearing as well as the pivoting axis of the trailing link arms of the rear wheels and the tank. A link arm wheel suspension is also feasible with the same arrangement. The transmission is provided by drive shafts in the pivoting axis of the trailing link arms via pinions at the ends of the drive shafts and chains or toothed belts on pinions fixed to the rear wheels. This leaves the space between the rear wheels free for the rear passengers.

Telescopic struts for a McPherson axle suspension on the front wheels are fitted to the top flanges 8 of the longitudinal members 1, and the associated cross-arms to the junction between the floor panel 5 and longitudinal member 1.

Four seats 7 take the form of bucket seats with widely embracing seat side walls, and thus also fulfil a safety function in the event of side impact.

The use of four-point belts to safeguard the lateral safety function of the seats 7 is advantageous. The belts are anchored to the torsion-resistant cross-member 2. The sides of the seats 7 are fixed and supported on the outside on the longitudinal members 1. Any space between the seats 7 and the longitudinal members 1 should then be used for a support to absorb the energy of a side impact. The adjacent sidewalls of two adjacent seats 7 on the inside are joined directly together. All four seats 7 are supported by the seat-backs against the middle cross-member 2. Fixing elements between the seat-back and the torsion-resistant cross-member 2 should be constructed to dampen vibrations, to prevent transfer of engine vibration from the cross-member 2 to the seat 7. The rear seats face away from the direction of travel, so that the head-rests of the front and rear seats can make contact above the cross-member 2. This makes it possible for all four seats to be made as a unified (plastic) shell. Because of the multiple support of seats 7 with each other and in the structure, they can be made of substantially lighter construction than the conventional free-standing seats which can transmit forces only through the vehicle floor. Also the attachment points are loaded that much less. If the space between the seats and the cross-member 2 is filled with an insulating material, effective sound insulation of the principal acoustic disadvantage of central engine can be achieved. Together with the insulating material, the construction of all the seats as an enclosed shell helps to provide soundproofing. As the driver's seat cannot be moved due to its fixing on the structure, the pedals are fixed to a cradle so that they can be moved longitudinally. It is also useful for the steering wheel to be adjustable in a longitudinal direction to adapt to the body size of the driver.

Between the front and rear seats a roll-over bar is fixed to the longitudinal member 1 and the cross-member 2, which is not incorporated in the vehicle roof 16. The purpose of the roll-over bar can also be fulfilled by the seat shell 7, if it is constructed with sufficient stability and the head-rests are extended to the vehicle roof.

Due to the high door-sill (top flange 8 of longitudinal member 1), the doors need to open upwards. For this reason there are provided two doors 12, 13 (FIG. 3) extending across the entire width of the vehicle to the longitudinal member 1, and including the front windscreen and respectively the rear-window for each of the front and rear passengers. The doors 12, 13 open upwards around a horizontal-hinge normally to the direction of travel. As the doors 12, 13 open upwards, the top edge of the outer longitudinal member 1 can be located substantially higher than the door sills in conventional PKWs (passenger cars). The top edge of the longitudinal member 1 lies above the centre of gravity of the vehicle. The front door 12 is linked to the bodywork 14 by the hinge. Moreover is feasible for the steering column to swing forwards on opening, as with the BMW Isetta Ⓡ, to facilitate getting in and out of the car. In this case however a safeguard should be incorporated to make it possible for the car to move only when the steering column is securely locked in position.

The vehicle roof 16 including side windows forms with the hingedly-attached rear door 13 a unit which is connected with the bodywork 14 via a detachable interconnection. If this unit is removed for one thing the vehicle can be used as a convertible (see FIG. 4) and for another, if the vehicle after overturning, comes to rest on its roof after release the interconnection from outside provides for emergency escape. This detachable interconnection can be in the form of a fluid-filled hose 17 interposed between the margins of the bodywork 14 and the roof 16 in the region of the common seam and a C-shaped profile 15 that slides thereover. The C-shaped profile 15 holds the bodywork 14 and roof 16 together at their margins and can simply be ripped off in an emergency or pushed backwards or forwards for normal removal of the roof 16.

Another possibility is to fill the flexible hose 17 with a pressurised fluid, so that to release the interconnection valves are opened which drain the flexible hose 17.

A further variant for releasing the roof 16 is shown in FIG. 6: a rotatably-journalled round tube 18 with a locking catch on the upper side is fixed on the underside onto the bodywork 14 and on the upper side retains the roof 16 by means of the locking catch. Two hand-levers fixed to the tube 18 on the inside of the vehicle, within reach of the respective front and rear passengers (not shown in the Figure), and a further lever on the outside of the vehicle are so arranged that by movement of the lever away from the sidewall of the vehicle, the locking catches release the roof 16.

What is claimed is:

1. A passenger car comprising a supporting structure, a drive unit and a driver's seat having a seat-surface, the supporting structure including an inverted hat-shaped longitudinal profile having a floor panel and at least two longitudinal members, the longitudinal members being joined together in the middle by means of a torsionally rigid cross-member which is constructed as a large-volume tubular profile closed by the floor panel and accommodates at least parts of the drive unit, the longitudinal members being formed by bending the floor panel upwards at the side and, in order to increase the flexural rigidity of the longitudinal members around the transverse axis, the vertical extension of the longitudinal members being sufficiently great that the top edge is located at least at the height of the seat-surface of the driver's seat.

2. The passenger car according to claim 1, in which the longitudinal members at the top edge are bent over outwards and downwards, so that a strong longitudinal flange is formed on the top edge of the longitudinal member.

3. The passenger car according to claim 1, in which the front seats are fixed at the side to the longitudinal member, via the seat-back to the torsion-resistant cross-member and via the seat surface to the floor.

4. The passenger car according to claim 1, in which rear seats are incorporated in the structure in the same way as the front seats but facing away from the direction of travel.

5. The passenger car according to claim 1, in which the vertical extesion of the longitudinal member is so great that the line between the centre of gravity of the passenger car and the impact surface of a frontal or rear collision does not run substantially above the at least two longitudinal members.

6. The passenger car according to claim 1, in which the longitudinal members are interconnected at the front and rear ends by additional cross-members.

7. The passenger car according to claim 6, in which the longitudinal members extend virtually over the entire length of the passenger car and are formed as energy-absorbing crumple zones in front of the front cross-member and behind the rear cross-members.

8. The passenger car according to claim 1, in which a third longitudinal member is integrated into the floor panel and is formed as a high, upwardly-directed longitudinal corrugation of the floor panel in the middle of the passenger car, and the floor panel is slightly corrugated at the front and back ends to define the crumple zones.

9. The passenger car according to claim 1, comprising doors folding upwards and to the front and respectively the back across the entire width of the vehicle, with the doors incorporating a windscreen and respectively a rear window.

10. The passenger car according to claim 1, comprising a vehicle roof including side windows and being arranged above the at least two longitudinal members and between door openings as a flexible part that can be detached from the passenger car, so that the passenger car can be used on the one hand as a convertible and on the other hand can be provided with an emergency escape in the event of the vehicle coming to rest on its roof after it overturns.

11. The passenger car according to claim 1, comprising a rear wheel suspension attached to the longitudinal member.

12. The passenger car according to claim 1, comprising a rear wheel suspension constructed as one of a trailing link arm and a composite linkage, and joined to the torsion-resistant cross-member.

* * * * *